(12) United States Patent (10) Patent No.: US 12,595,328 B2
Yu et al. (45) Date of Patent: Apr. 7, 2026

(54) PERFLUOROETHER FLUORORUBBER AND PREPARATION METHOD THEREFOR AND USE THEREOF

(71) Applicant: ZHONGHAO CHENGUANG RESEARCH INSTITUTE OF CHEMICAL INDUSTRY CO., LTD., Sichuan (CN)

(72) Inventors: Jinlong Yu, Sichuan (CN); Bo Liu, Sichuan (CN); Ziqiang Zhong, Sichuan (CN); Tingjian Zhang, Sichuan (CN); Zhongliang Xiao, Sichuan (CN)

(73) Assignee: ZHONGHAO CHENGUANG RESEARCH INSTITUTE OF CHEMICAL INDUSTRY CO., LTD., Sichuan (CN)

( * ) Notice: Subject to any disclaimer, the term of this patent is extended or adjusted under 35 U.S.C. 154(b) by 575 days.

(21) Appl. No.: 18/044,445

(22) PCT Filed: May 12, 2021

(86) PCT No.: PCT/CN2021/093277
§ 371 (c)(1),
(2) Date: Mar. 8, 2023

(87) PCT Pub. No.: WO2022/052498
PCT Pub. Date: Mar. 17, 2022

(65) Prior Publication Data
US 2023/0322991 A1 Oct. 12, 2023

(30) Foreign Application Priority Data

Sep. 9, 2020 (CN) .......................... 202010940066.4

(51) Int. Cl.
| | |
|---|---|
| *C08F 14/26* | (2006.01) |
| *C08F 2/30* | (2006.01) |
| *C08F 236/20* | (2006.01) |
| *C08F 293/00* | (2006.01) |
| *C08K 3/30* | (2006.01) |
| *C08K 5/02* | (2006.01) |
| *C08K 5/095* | (2006.01) |

(52) U.S. Cl.
CPC .............. *C08F 236/20* (2013.01); *C08F 2/30* (2013.01); *C08K 3/30* (2013.01); *C08K 5/02* (2013.01); *C08K 5/095* (2013.01); *C08K 2003/3045* (2013.01)

(58) Field of Classification Search
CPC .... C08F 14/26; C08F 214/262; C08F 293/00; C08F 2/001; C08K 5/0025
See application file for complete search history.

(56) References Cited

U.S. PATENT DOCUMENTS

| | | | |
|---|---|---|---|
| 4,105,716 A | 8/1978 | Sakai et al. | |
| 5,639,838 A * | 6/1997 | Albano ............... | C08F 214/262 |
| | | | 526/254 |

FOREIGN PATENT DOCUMENTS

| | | | | |
|---|---|---|---|---|
| CN | 106317290 A * | 1/2017 | | |
| CN | 107652386 A | 2/2018 | | |
| CN | 110713564 A | 1/2020 | | |
| CN | 110818825 A | 2/2020 | | |
| CN | 116063607 A * | 5/2023 | .......... | C08F 293/005 |
| EP | 1029875 A1 * | 8/2000 | ........... | C08F 293/00 |
| EP | 1153946 A1 | 11/2001 | | |
| EP | 1244715 B1 * | 10/2007 | .............. | C08F 16/24 |
| EP | 1148072 B1 | 8/2009 | | |
| EP | 3075752 B1 * | 12/2020 | .......... | C08K 5/0025 |
| JP | 2002060432 A | 2/2002 | | |
| JP | 2002097230 A | 4/2002 | | |
| JP | 2004175916 A | 6/2004 | | |
| JP | 2009513795 A | 4/2009 | | |
| WO | 2008078738 A1 | 7/2008 | | |
| WO | 2009119723 A1 | 10/2009 | | |
| WO | WO-2024165313 A1 * | 8/2024 | ................ | C08F 2/22 |

OTHER PUBLICATIONS

Machine translation into English of CN-106317290-A (Year: 2017).*
Machine translation into English of CN-116063607-A (Year: 2023).*
Lei Feng, Study on Tetrafluoroethylene /Perfluoro Propyl Vinyl Ether Dispersion Copolymerization and relationship of copolymers' structure and properties, "Full-text Database of Chinese Excellent doctoral and Master's Degree Thesis (Master) Engineering Science and Technology I series", Mar. 2005.
First Office Action and English Translation for corresponding Chinese application No. 202010940066.4 dated Nov. 3, 2022.

* cited by examiner

*Primary Examiner* — Karuna P Reddy
(74) *Attorney, Agent, or Firm* — LEASON ELLIS LLP

(57) ABSTRACT

The present invention provides a perfluoroether fluororubber and a preparation method therefor and use thereof. The perfluoroether fluororubber is prepared by a stepwise polymerization method, wherein polymerization monomers in each step of polymerization comprise tetrafluoroethylene and a perfluoroalkyl vinyl ether. The preparation method for the perfluoroether fluororubber provided in the present invention can shorten polymerization time and improve production efficiency, and the finally obtained perfluoroether fluororubber is good in processability, high in strength, low in hardness and compression deformation and good in medium resistance.

16 Claims, No Drawings

PERFLUOROETHER FLUORORUBBER AND PREPARATION METHOD THEREFOR AND USE THEREOF

CROSS-REFERENCE TO RELATED PATENT APPLICATIONS

This application is a U.S. National Stage Application under 35 U.S.C. § 371 of International Patent Application No. PCT/CN2021/093277 filed May 12, 2021, which claims the benefit of priority of Chinese Patent Application No. 202010940066.4 filed Sep. 9, 2020, both of which are incorporated by reference in their entireties. The International Application was published on Mar. 17, 2022, as International Publication No. WO/2022/052498 A1.

TECHNICAL FIELD

The present invention belongs to the technical field of fluoroelastomers, and relates to a perfluoroether fluororubber and the preparation method therefor and use thereof, particularly relates to a copolymer composition of tetrafluoroethylene and perfluoroalkyl vinyl ether and the preparation method therefor and use thereof.

BACKGROUND

Perfluoroether fluororubber is mainly made via copolymerization of tetrafluoroethylene (TFE) and perfluoroalkyl vinyl ether (PAVE) as the main comonomers, and usually with further vulcanization point monomers such as perfluorinated bromine-containing, iodine-containing, or cyanide-containing compounds and the like. The vulcanized products of perfluoroether fluororubber have excellent high temperature resistance and medium resistance, and are favored by petrochemical, semiconductor industry and other industries.

CN107868163A discloses a preparation method of low-temperature resistant perfluoroether elastomer, wherein the vulcanization point monomer in the preparation method cannot be uniformly dispersed in the elastomer chain segment, and the TFE homopolymer chain segment increases due to strong activity of TFE, which in turn leads to poor vulcanization performance of its product, and the vulcanized rubber has a higher hardness and is difficult to process.

CN1120343A discloses a preparation method of low-temperature perfluoroether elastomer, and the patent application uses high-molecular-weight perfluoropolyether and perfluoroelastomer to prepare a modified perfluoroether elastomer by blending. Due to the addition of modified monomer of perfluoropolyether in the polymerization process, the activity of the polymerization system is weakened resulting in a long polymerization time, which is not conducive to industrial production, and after the polymerization is completed, the perfluoropolyether remained in the polymerization system cannot be recycled, which is not conducive to environmental protection.

Therefore, it is necessary to develop a perfluoroether fluororubber with short processing time and good processability after vulcanization in order to meet the application requirements.

SUMMARY

The object of the present invention is to provide a perfluoroether fluororubber and the preparation method therefor and use thereof. The preparation method for perfluoroether fluororubber according to the present invention can shorten polymerization time and improve production efficiency, and finally provide perfluoroether fluororubber with good processability, high strength, low hardness and compression deformation, and good medium resistance.

In order to achieve this object, the technical solutions adopted in the present invention are as follows.

In the first aspect, the present invention provides a preparation method for a perfluoroether fluororubber, wherein the perfluoroether fluororubber is prepared by a stepwise polymerization method;

wherein, the polymerization monomers in each step of polymerization comprise tetrafluoroethylene and a perfluoroalkyl vinyl ether.

Compared with one-step polymerization method (one-pot method), the present invention adopts a stepwise polymerization method, which can ensure a more uniform distribution of tetrafluoroethylene, less tetrafluoroethylene homopolymer chain segment in the chain segments, and thus lower hardness and compression deformation of the final perfluoroether fluororubber.

In the present invention, the polymerization monomers in each step of polymerization further comprise a vulcanization point monomer, preferably the vulcanization point monomer is perfluoroiodoolefin, further preferably is $I(CF_2)_2OCF=CF_2$.

In the stepwise polymerization method according to the present invention, adding a portion of the vulcanization point monomer in each polymerization step ensures a relative uniform distribution of the vulcanization point monomer, which in turn allows the final rubber to have good vulcanization performance and good processability.

The vulcanization point monomer is inserted to the polymer, so that perfluoroether fluororubber can be cross-linked and vulcanized by a peroxide vulcanization system, and at the same time, the iodine atom is very easy to de-radicalize under the action of free radicals, which is conducive to the vulcanization of peroxide; the vulcanization point monomer is beneficial to improve the processability of the perfluoroether fluororubber to a certain extent.

As a preferred technical solution of the present invention, the stepwise polymerization method is a three-step polymerization method comprising:

(1) subjecting pre-polymerization monomers composed of a vulcanization point monomer, tetrafluoroethylene and a perfluoroalkyl vinyl ether to pre-polymerization reaction;

(2) further adding mid-polymerization monomers composed of a vulcanization point monomer, tetrafluoroethylene and a perfluoroalkyl vinyl ether for mid-polymerization reaction; and (3) further adding post-polymerization monomers composed of a vulcanization point monomer, tetrafluoroethylene and a perfluoroalkyl vinyl ether for polymerization reaction, and collecting the reaction product.

The molar ratio of the vulcanization point monomer, tetrafluoroethylene and the perfluoroalkyl vinyl ether in the pre-polymerization monomers according to the present invention is (1-3):(60-70):(30-40).

In the present invention, the range 1-3 may be 1.5, 2, 2.5, etc., the range 60-70 may be 62, 64, 65, 68, etc., and the range 30-40 may be 32, 34, 35, 36, 38, etc.

The molar ratio of the vulcanization point monomer, tetrafluoroethylene and the perfluoroalkyl vinyl ether in the mid-polymerization monomers is (0.1-1):(35-55):(40-65).

In the present invention, the range 0.1-1 may be 0.2, 0.4, 0.5, 0.6, 0.8, etc., the range 35-55 may be 38, 40, 42, 45, 48, 50, 52, etc., and the range 40-65 may be 42, 45, 48, 50, 52, 55, 58, 60, 62, etc.

The molar ratio of the vulcanization point monomer, tetrafluoroethylene and the perfluoroalkyl vinyl ether in the post-polymerization monomers is (1-3):(60-70):(30-40).

In the present invention, the range 1-3 may be 1.5, 2, 2.5, etc., the range 60-70 may be 62, 64, 65, 68, etc., and the range 30-40 may be 32, 34, 35, 36, 38, etc.

Perfluoroether fluororubber obtained by the stepwise polymerization method according to the present invention has an A-B-A block morphology, and the A block on both sides is a terpolymeric vulcanization point monomer/TFE/PAVE (vulcanization point monomer/tetrafluoroethylene/perfluoroalkyl vinyl ether), and the content of perfluoroalkyl vinyl ether in block B is high, which can ensure that the final perfluoroether fluororubber has good flexibility, and is conducive to the processing and application of the product. The distributions of the vulcanization point monomer and tetrafluoroethylene in the perfluoroether fluororubber according to the present invention are relatively uniform, so its hardness and compression deformation are low, and the processability is good.

As a preferred technical solution of the present invention, based on 100% of the total mole number of the pre-polymerization monomers, the content of the vulcanization point monomer is 1-3%, such as 1.5%, 2%, 2.5%, etc., the content of tetrafluoroethylene is 60-70%, such as 62%, 64%, 65%, 68%, etc., and the content of perfluoroalkyl vinyl ether is 30-40%, such as 32%, 34%, 35%, 36%, 38%, etc.

Based on 100% of the total mole number of the mid-polymerization monomers, the content of the vulcanization point monomer is 0.1-1%, such as 0.2, 0.4, 0.5, 0.6, 0.8, etc., the content of tetrafluoroethylene is 35-55%, such as 38, 40, 42, 45, 48, 50, 52, etc., and the content of perfluoroalkyl vinyl ether is 40-65%; such as 42, 45, 48, 50, 52, 55, 58, 60, 62, etc.

Based on 100% of the total mole number of the post-polymerization monomers, the content of the vulcanization point monomer is 1-3%, such as 1.5%, 2%, 2.5%, etc., the content of tetrafluoroethylene is 60-70%, such as 62%, 64%, 65%, 68%, etc., and the content of perfluoroalkyl vinyl ether is 30-40%, such as 32%, 34%, 35%, 36%, 38%, etc.

The mass ratio of the pre-polymerization monomers, the mid-polymerization monomers and the post-polymerization monomers in the present invention is (20-35):(30-60):(20-35).

The range 20-35 may be 22, 25, 28, 30, 32, etc., the range 30-60 may be 35, 40, 45, 50, 55, etc., and the range 20-35 may be 22, 25, 28, 30, 32, etc.

As a preferred technical solution of the present invention, the pre-polymerization monomers account for 20-35% of the total mass of the polymerization monomers, such as 22%, 24%, 25%, 28%, 30%, 32%, etc., the mid-polymerization monomers account for 30-60% of the total mass of the polymerization monomers, such as 35%, 40%, 45%, 50%, 55%, etc., and the post-polymerization monomers account for 20-35% of the total mass of the polymerization monomers, such as 22%, 24%, 25%, 28%, 30%, 32%, etc.

As a preferred technical solution of the present invention, the mass of the post-polymerization monomers is the same as that of the pre-polymerization monomers.

As a preferred technical solution of the present invention, the proportion of each component in the post-polymerization monomers is the same as that in the pre-polymerization monomers.

As a preferred technical solution of the present invention, the total polymerization time of the stepwise polymerization method is 2-4 h, such as 2.2 h, 2.5 h, 2.8 h, 3.0 h, 3.2 h, 3.5 h, 3.8 h, etc.

The preparation method according to the present invention can greatly shorten the reaction time, from the current more than 90 h to less than 4 h, and thus greatly improve the production efficiency.

The polymerization pressures of the pre-polymerization reaction and the post-polymerization reaction in the present invention are each independently selected from the range of 2.8-3.5 MPa, such as 2.9 MPa, 3.0 MPa, 3.1 MPa, 3.2 MPa, 3.3 MPa, 3.4 MPa, etc. The polymerization pressure of the mid-polymerization reaction is 1.6-2.5 MPa, such as 1.7 MPa, 1.8 MPa, 1.9 MPa, 2.0 MPa, 2.2 MPa, 2.4 MPa, etc.

The reaction temperatures of the pre-polymerization reaction, the mid-polymerization reaction and the post-polymerization reaction in the present invention are each independently selected from the range of 60-95° C., such as 65° C., 70° C., 75° C., 80° C., 85° C., 90° C., etc.

Since the reactivity ratios of tetrafluoroethylene monomer and perfluoroalkyl vinyl ether monomer in the copolymerization process are quite different, the present invention adopts higher polymerization pressures for pre-polymerization and post-polymerization and reduces the polymerization pressure for the mid-polymerization process to avoid excessive hardness by controlling and using different polymerization processes at different polymerization stages. The present invention increases the amount of the flexible monomer perfluoroalkyl vinyl ether inserted in the polymer chain segment, enhancing the flexibility of the material. Therefore, the vulcanization point monomer and tetrafluoroethylene in the perfluoroether fluororubber according to the present invention are distributed relatively uniformly, so that it has excellent tensile strength while its hardness and compression deformation are low, and its medium resistance and processability are better.

In the present invention, if the polymerization pressures in the pre- and post-stages are low, the content of perfluoroalkyl vinyl ether on both sides of the polymer increases, and the content of fluorine decreases, which is not conducive to the medium resistance and good strength of the polymer; if the polymerization pressure in the mid-stage is high, the content of tetrafluoride in the middle segment of the polymer is higher, the rigidity of the polymer is enhanced, and the hardness index of the polymer is increased, which is not conducive to the processing and application of the polymer.

As a preferred technical solution of the present invention, before adding the mid-polymerization monomers, unreacted pre-polymerization monomers are recovered, preferably before adding the post-polymerization monomers, unreacted mid-polymerization monomers are recovered.

As a preferred technical solution of the present invention, the method further comprises recovering unreacted post-polymerization monomers in the reaction product obtained in step (3), to provide an emulsion containing perfluoroether fluororubber.

As a preferred technical solution of the present invention, the dispersion medium in the stepwise polymerization method is water.

In the present invention, the system of the pre-polymerization reaction further comprises an initiator, preferably the initiator is any one or a combination of at least two of ammonium persulfate, potassium persulfate or potassium permanganate. Preferably, based on 100 parts by weight of the aqueous medium, the dosage of the initiator is 0.0001-8 parts by weight, such as 0.1 parts by weight, 0.5 parts by weight, 1 part by weight, 2 parts by weight, 3 parts by weight, 4 parts by weight, 5 parts by weight, 6 parts by weight, 7 parts by weight, etc.

In the present invention, the system of the pre-polymerization reaction further comprises a perfluorooctanoate as an emulsifier. Preferably, based on 100 parts by weight of the aqueous medium, the dosage of the emulsifier is 0.01-5 parts by weight, such as 1 parts by weight, 2 parts by weight, 3 parts by weight, 4 parts by weight, etc.

In the present invention, the system of the pre-polymerization reaction further comprises a chain transfer agent. Preferably the chain transfer agent is any one or a combination of at least two of 1,2-diiodoperfluoroethane, 1,3-diiodoperfluoropropane or 1,4-diiodoperfluorobutane. Preferably, based on the total mass of the polymerization monomers, the dosage of the chain transfer agent is 0.01-5%, such as 0.1%, 0.5%, 1%, 2%, 3%, 4%, etc.

The present invention provides a specific embodiment, wherein the preparation method comprises the following steps:

(1) adding deionized water to a reactor, vacuumizing to an oxygen content of ≤30 ppm, then adding an emulsifier, and heating to 60-95° C.;

(2) adding the pre-polymerization monomers, increasing the pressure of the reactor to 2.8-3.5 MPa, then adding an initiator and a chain transfer agent to carry out the pre-polymerization reaction; when the added amount of the pre-polymerization monomers being 20-35% of the total mass of the polymerization monomers, recovering unreacted monomers;

(3) adding the mid-polymerization monomers, then reducing the pressure to 1.6-2.5 MPa to carry out the mid-polymerization reaction; when the added amount of the mid-polymerization monomers being 30-85% of the total mass of the polymerization monomers, recovering unreacted monomers;

(4) adding the post-polymerization monomers, then increasing the pressure to 2.8-3.5 MPa to carry out the post-polymerization reaction; when the added amount of the post-polymerization monomers being 20-35% of the total mass of the polymerization monomers, recovering unreacted monomers, and an emulsion containing the perfluoroether fluororubber being obtained; and (5) the emulsion being agglomerated, washed and dried to provide the perfluoroether fluororubber.

The agglomeration, washing and drying of the emulsion of the present invention are conventional processes in the art, and will not be repeated herein.

In the second aspect, the present invention provides a perfluoroether fluororubber prepared by the preparation method described in the first aspect.

The perfluoroether fluororubber prepared by the preparation method according to the present invention has high tensile strength of up to 20 MPa or more, elongation at break up to 200%, low hardness and compression deformation, good medium resistance and processability.

In the third aspect, the present invention provides use of the perfluoroether fluororubber described in the second aspect in petrochemical materials and semiconductor materials.

Compared with the prior art, the present invention achieves the following beneficial effects:

(1) the present invention adopts a stepwise polymerization method, so that the tetrafluoroethylene and vulcanization point monomer in the chain segment can be distributed relatively uniformly, thereby ensuring that the hardness of the final material is lower and the vulcanization performance is better; and (2) the final rubber prepared by the polymerization method according to the present invention has an A-B-A block morphology, with a specific structure which can ensure that the obtained rubber has high tensile strength and low hardness and good processability.

BEST MODE

The technical solutions of the present invention are further explained by the following specific embodiments. Those skilled in the art should understand that the embodiments are only to help understand the present invention and should not be regarded as a specific limitation of the present invention.

Example 1

A preparation method of perfluoroether fluororubber compreses steps of:

(1) adding 30 L of deionized water to a 50 L reactor, vacuumizing to an oxygen content of ≤30 ppm, adding 35 g of ammonium perfluorooctanoate, and heating the contents in the reactor to 85° C.;

(2) feeding pre-polymerization monomers composed of $I(CF_2)_2OCF{=}CF_2$, TFE and perfluoromethyl vinyl ether with a molar ratio of 1:60:39, increasing the pressure of the reactor to 3.0 MPa, adding 15 g of potassium persulfate and 25 g of 1,2-diiodoperfluoroethane to carry out the pre-polymerization reaction; when the added amount of the pre-polymerization monomers was 2.5 kg, recovering the unreacted monomers;

(3) introducing mid-polymerization monomers composed of $I(CF_2)_2OCF{=}CF_2$, TFE and perfluoromethyl vinyl ether with a molar ratio of 0.1:35:64.9 into the reactor, adjusting the polymerization pressure to 2.0 MPa to carry out the mid-polymerization reaction; when the added amount of the mid-polymerization monomers was 3.3 kg, recovering the unreacted monomers;

(4) further introducing post-polymerization monomers composed of $I(CF_2)_2OCF{=}CF_2$, TFE and perfluoromethyl vinyl ether with a molar ratio of 1:60:39 into the reactor, increasing the pressure of the reactor to 3.0 MPa; when the added amount of the post-polymerization monomers was 2.5 kg, ending the reaction and recovering the unreacted monomers; an emulsion containing the perfluoroether fluororubber being obtained; and (5) the emulsion being mechanically agglomerated, washed, and vacuum dried at 100° C. to provide about 7.5 kg of the perfluoroether fluororubber product.

Example 2

A preparation method of perfluoroether fluororubber compreses steps of:

(1) adding 30 L of deionized water to a 50 L reactor, vacuumizing to an oxygen content of ≤30 ppm, adding 50 g of ammonium perfluorooctanoate, and heating the contents in the reactor to 90° C.;

(2) feeding pre-polymerization monomers composed of $I(CF_2)_2OCF{=}CF_2$, tetrafluoroethylene and perfluoropropyl vinyl ether with a molar ratio of 3:67:30, increasing the pressure of the reactor to 3.5 MPa, adding 40 g of potassium persulfate and 50 g of 1,4-diiodoperfluorobutane to carry out the pre-polymerization reaction; when the added amount of the pre-polymerization monomers was 3.5 kg, recovering the unreacted monomers;

(3) introducing mid-polymerization monomers composed of $I(CF_2)_2OCF=CF_2$, TFE and perfluoropropyl vinyl ether with a molar ratio of 1:55:44 into the reactor, adjusting the polymerization pressure to 2.5 MPa to carry out the mid-polymerization reaction; when the added amount of the mid-polymerization monomers was 3.0 kg, recovering the unreacted monomers;

(4) further introducing post-polymerization monomers composed of $I(CF_2)_2OCF=CF_2$, TFE and perfluoropropyl vinyl ether with a molar ratio of 3:67:30 into the reactor, increasing the pressure of the reactor to 3.5 MPa; when the added amount of the post-polymerization monomers was 3.5 kg, ending the reaction and recovering the unreacted monomers; an emulsion containing the perfluoroether fluororubber being obtained; and (5) the emulsion being mechanically agglomerated, washed, and vacuum dried at 100° C. to provide the perfluoroether fluororubber product.

Example 3

Compared with Example 1, the difference of this comparative Example lies in that, the pressure of mid-polymerization reaction in step (3) was 3.0 MPa.

Example 4

Compared with Example 1, the difference of this comparative Example lies in that, the pressures of the pre-polymerization reaction in step (2) and the post-polymerization reaction in step (4) were both 2.0 MPa.

Example 5

Compared with Example 1, the difference of this comparative Example lies in that, the molar ratio of $I(CF_2)_2OCF=CF_2$, TFE and perfluoromethyl vinyl ether introduced in step (3) was 0.1:50:49.9.

Comparative Example 1

A preparation method of perfluoroether fluororubber compreses steps of:

(1) adding 30 L of deionized water to a 50 L reactor, vacuumizing to an oxygen content of ≤30 ppm, adding 35 g of ammonium perfluorooctanoate, and heating the contents in the reactor to 85° C.;

(2) feeding $I(CF_2)_2OCF=CF_2$, TFE and perfluoromethyl vinyl ether with a molar ratio of 1:45:55 and the total addition amount of the polymerization monomers being 8.3 kg, increasing the pressure of the reactor to 3.0 MPa, adding 15 g of potassium persulfate and 25 g of 1,2-diiodoperfluoroethane to carry out the polymerization reaction; when the solid content was about 21%, recovering the unreacted monomers and an emulsion containing the perfluoroether fluororubber being obtained; and (5) the emulsion being mechanically agglomerated, washed, and vacuum dried at 100° C. to provide about 8.0 kg of the perfluoroether fluororubber product.

Performance Test

The raw rubbers (perfluoroether fluororubber product) prepared by Example 1 and Comparative Example 1 were vulcanized, and the vulcanization formula is shown in Table 1:

TABLE 1

| Component or procedure | Parameter |
| --- | --- |
| Raw rubber | 100 parts |
| 2,5-dimethyl-2,5-di(tert-butylperoxy)hexane, 75% | 4 parts |
| TAIC | 3 parts |
| N990 | 20 parts |
| First-stage vulcanization | 170° C. × 10 min |
| Second-stage vulcanization | 232° C. × 4 h |

The performance test of raw rubbers and vulcanized samples was conducted to measure the Mooney viscosity, fluorine content, mechanical properties (tensile strength and elongation at break), hardness and compression deformation. The test results are shown in Table 2:

TABLE 2

| Sample | Mooney viscosity | F content/% | Tensile strength/MPa | Elongation at break/% | Hardness/Ha | Compression deformation/% |
| --- | --- | --- | --- | --- | --- | --- |
| Example 1 | 55 | 72 | 28.5 | 180 | 78 | 25 |
| Example 2 | 62 | 72.1 | 29.2 | 180 | 77 | 26 |
| Example 3 | 75 | 72.0 | 32.0 | 80 | 88 | 45 |
| Example 4 | 22 | 70.5 | 16.3 | 90 | 82 | 38 |
| Example 5 | 42 | 70.1 | 14.8 | 110 | 85 | 39 |
| Comparative Example 1 | 78 | 72.1 | 26.5 | 110 | 92 | 37 |

It can be seen from the Examples and performance tests that the perfluoroether fluororubber prepared by the preparation method according to the present invention has good tensile strength and elongation at break, while the hardness and compression deformation are low, and the processability is good.

From the comparison of Example 1 with Examples 2-4, it can be seen that the pressures used in the stepwise polymerization reaction according to the present invention need to be within the limited ranges of the present invention to provide a product with excellent tensile strength while its hardness and compression deformation are low, and the medium resistance and processability are better. From the comparison of Example 1 with Example 5, it can be seen that the feedstock ratio in the mid-term polymerization reaction needs to be within the limited range of the present invention. From the comparison of Example 1 with Comparative Example 1, it can be seen that the perfluoroether fluororubber obtained by stepwise polymerization method has lower hardness and compression deformation, and has better vulcanization performance and better processability.

The applicant declares that the present invention illustrates the perfluoroether fluororubber, the preparation method therefor and use thereof according to the present invention by the above embodiments, but the present invention is not limited to the above detailed methods, that is, it does not mean that the present invention must rely on the above detailed methods to be implemented. Those skilled in the art should understand that any modification of the present invention, equivalent substitution of each and any raw material of the product of the present invention, addition of auxiliary ingredient, selection of a specific method, etc., all fall within the scope of protection and disclosure of the present invention.

What is claimed is:

1. A preparation method for a perfluoroether fluororubber, wherein the perfluoroether fluororubber is prepared by a stepwise polymerization method;

wherein, the polymerization monomers in each step of polymerization comprise tetrafluoroethylene and a perfluoroalkyl vinyl ether;

wherein the polymerization monomers in each step of polymerization further comprise a vulcanization point monomer;

the stepwise polymerization method is a three-step polymerization method, comprising:

(1) subjecting pre-polymerization monomers composed of a vulcanization point monomer, tetrafluoroethylene and a perfluoroalkyl vinyl ether to a pre-polymerization reaction; wherein molar ratio of the vulcanization point monomer, tetrafluoroethylene and the perfluoroalkyl vinyl ether in the pre-polymerization monomers is (1-3):(60-70):(30-40);

(2) further adding mid-polymerization monomers composed of a vulcanization point monomer, tetrafluoroethylene and a perfluoroalkyl vinyl ether for a mid-polymerization reaction; wherein molar ratio of the vulcanization point monomer, tetrafluoroethylene and the perfluoroalkyl vinyl ether in the mid-polymerization monomers is (0.1-1):(35-55):(40-65); and (3) further adding post-polymerization monomers composed of a vulcanization point monomer, tetrafluoroethylene and a perfluoroalkyl vinyl ether for a post-polymerization reaction, and collecting reaction product comprising perfluoroether fluororubber; wherein molar ratio of the vulcanization point monomer, tetrafluoroethylene and the perfluoroalkyl vinyl ether in the post-polymerization monomers is (1-3):(60-70):(30-40).

2. The preparation method according to claim 1, wherein the vulcanization point monomer in each step of the polymerization is a perfluoroiodoolefin.

3. The preparation method according to claim 2, wherein based on 100% of total moles of the pre-polymerization monomers, content of the vulcanization point monomer is 1-3%, content of tetrafluoroethylene is 60-70%, and content of the perfluoroalkyl vinyl ether is 30-40%;

based on 100% of total moles of the mid-polymerization monomers, content of the vulcanization point monomer is 0.1-1%, content of tetrafluoroethylene is 35-55%, and content of the perfluoroalkyl vinyl ether is 40-65%; and based on 100% of total moles of the post-polymerization monomers, content of the vulcanization point monomer is 1-3%, content of tetrafluoroethylene is 60-70%, and content of the perfluoroalkyl vinyl ether is 30-40%.

4. The preparation method according to claim 3, wherein the mass ratio of the pre-polymerization monomers, the mid-polymerization monomers and the post-polymerization monomers is (20-35):(30-60):(20-35).

5. The preparation method according to claim 4, wherein mass of the post-polymerization monomers is same as that of the pre-polymerization monomers.

6. The preparation method according to claim 2, wherein total polymerization time of the stepwise polymerization method is 2-4 h; and/or polymerization pressures of the pre-polymerization reaction and the post-polymerization reaction are each independently selected from a range of 2.8-3.5 MPa, polymerization pressure of the mid-polymerization reaction is 1.6-2.5 MPa; and/or reaction temperatures of the pre-polymerization reaction, the mid-polymerization reaction and the post-polymerization reaction are each independently selected from a range of 60-95° C.; and/or before adding the mid-polymerization monomers, unreacted pre-polymerization monomers are recovered; and/or the preparation method further comprises recovery of unreacted post-polymerization monomers in the reaction product obtained in step (3), and obtaining an emulsion containing the perfluoroether fluororubber.

7. The preparation method according to claim 2, wherein the stepwise polymerization method uses water as a dispersion medium; and/or the pre-polymerization reaction further comprises an initiator; and/or the pre-polymerization reaction further comprises a perfluorooctanoate as an emulsifier; and/or the pre-polymerization reaction further comprises a chain transfer agent.

8. The preparation method according to claim 2, wherein the preparation method comprises the following steps:

(1) adding deionized water to a reactor, vacuumizing to an oxygen content of ≤30 ppm, then adding an emulsifier, and heating to 60-95° C.;

(2) adding the pre-polymerization monomers, increasing pressure of the reactor to 2.8-3.5 MPa, then adding an initiator and a chain transfer agent to carry out the pre-polymerization reaction; wherein added amount of the pre-polymerization monomers is 20-35% based on total mass of the polymerization monomers, recovering unreacted monomers;

(3) adding the mid-polymerization monomers, then reducing pressure to 1.6-2.5 MPa to carry out the mid-polymerization reaction, wherein added amount of the mid-polymerization monomers is 30-85% based on total mass of the polymerization monomers, recovering unreacted monomers;

(4) adding the post-polymerization monomers, then increasing pressure to 2.8-3.5 MPa to carry out the post-polymerization reaction; wherein added amount of the post-polymerization monomers is 20-35% based on total mass of the polymerization monomers, recovering unreacted monomers, and obtaining an emulsion containing the perfluoroether fluororubber; and (5) the emulsion being agglomerated, washed and dried to provide the perfluoroether fluororubber.

9. The preparation method according to claim 4, wherein the pre-polymerization monomers account for 20-35% of total mass of the polymerization monomers, the mid-polymerization monomers account for 30-60% of total mass of the polymerization monomers, and the post-polymerization monomers account for 20-35% of total mass of the polymerization monomers.

10. The preparation method according to claim 5, wherein proportion of each component in the post-polymerization monomers is same as that in the pre-polymerization monomers.

11. The preparation method according to claim 6, wherein before adding the post-polymerization monomers, unreacted mid-polymerization monomers are recovered.

12. The preparation method according to claim 7, wherein the initiator is any one or a combination of at least two of ammonium persulfate, potassium persulfate or potassium permanganate.

13. The preparation method according to claim 7, wherein based on 100 parts by weight of the aqueous dispersion medium, dosage of the initiator is 0.0001-8 parts by weight.

14. The preparation method according to claim 7, wherein based on 100 parts by weight of the aqueous dispersion medium, dosage of the emulsifier is 0.01-5 parts by weight.

15. The preparation method according to claim 7, wherein the chain transfer agent is any one or a combination of at least two of 1,2-diiodoperfluoroethane, 1,3-diiodoperfluoro-propane or 1,4-diiodoperfluorobutane.

16. The preparation method according to claim 7, wherein based on the total mass of the polymerization monomers, dosage of the chain transfer agent is 0.01-5%.

\* \* \* \* \*